(12) United States Patent
Chen et al.

(10) Patent No.: US 7,931,826 B2
(45) Date of Patent: Apr. 26, 2011

(54) WHITE LIGHT ILLUMINATION DEVICE

(75) Inventors: Teng-Ming Chen, Hsinchu (TW); Woan-Jen Yang, Taichung County (TW); Yao-Tsung Yeh, Taoyuan County (TW); Chien-Yueh Tung, Taipei (TW); Tien-Heng Huang, Tainan County (TW); Fang-Ching Chang, Tainan County (TW); Yung Chi Chen, Taichung County (TW); Wei-Jen Liu, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 661 days.

(21) Appl. No.: 11/957,571

(22) Filed: Dec. 17, 2007

(65) Prior Publication Data

US 2008/0149893 A1 Jun. 26, 2008

(30) Foreign Application Priority Data

Dec. 25, 2006 (TW) .............................. 95148781 A

(51) Int. Cl.
*H01L 33/00* (2010.01)
*C09K 11/80* (2006.01)
*C09K 11/79* (2006.01)
*C09K 11/64* (2006.01)
*C09K 11/59* (2006.01)
*C09K 11/55* (2006.01)

(52) U.S. Cl. ............ 252/301.4 R; 252/301.4 F; 257/98; 313/503; 313/486; 313/487

(58) Field of Classification Search ............ 252/301.4 F, 252/301.6 F; 257/98; 313/503
See application file for complete search history.

(56) References Cited

U.S. PATENT DOCUMENTS

| 3,839,219 | A | * | 10/1974 | Verstegen et al. | ........ 252/301.4 F |
|---|---|---|---|---|---|
| 5,998,925 | A | | 12/1999 | Shimizu et al. | |
| 6,294,800 | B1 | | 9/2001 | Duggal et al. | |
| 6,580,097 | B1 | | 6/2003 | Soules et al. | |
| 6,682,663 | B2 | | 1/2004 | Botty et al. | |
| 2003/0067265 | A1 | | 4/2003 | Srivastava et al. | |
| 2006/0291246 | A1 | * | 12/2006 | Hattori et al. | ................. 362/614 |

OTHER PUBLICATIONS

"HIgh-Color-Rendering Light Sources Consisting of a 350-nm Ultraviolet Light-Emitting Diode and Three-Basal-Color Phosphors" Toshio Nishida et al., Applied Physics Letters vol. 82, No. 22, Jun. 2003, pp. 3817-3819.
"Development of Phosphors for LEDs" L.S. Rohwer et al., The Electrochemical Society Interface, Summer 2003 pp. 36-39.
"Optical Properties of Three-Band White Light Emitting Diodes" Young-Duk Huh et al., Journal of the Electrochemical Society, Jan. 2003 , vol . 150 (2) , pp. H57-H60.
"White-Light Emission From Near UV InGaN-GaN LED Chip Precoated with Blue/Green/Red Phosphors" J.K. Shen et al., IEEE Photonics Technology Letters, vol. 15, No. 1, Jan. 2003.

* cited by examiner

*Primary Examiner* — C. Melissa Koslow
(74) *Attorney, Agent, or Firm* — Thomas|Kayden

(57) ABSTRACT

The invention provides a white light illumination device including an ultraviolet excitation light source and an ultraviolet excitable aluminosilicate phosphor. The ultraviolet excitable aluminosilicate phosphor has a formula as $(M_{1-x}, Re_x)_a Al_b Si_c O_d :D$, wherein M is Mg, Ca, Sr, Ba or combination thereof. In addition, Re is Y, La, Pr, Nd, Eu, Gd, Tb, Ce, Dy, Yb, Er, Sc, Mn, Zn, Cu, Ni, Lu or combination thereof, while $0<a, b, c, d$, $2a+3b+4c=2d$, and $0 \leq x \leq a$. Furthermore, D is F, Cl, I, Br, OH, S or combinations thereof. The aluminosilicate phosphor emits blue or blue-green light under the excitation of ultraviolet light, and the aluminosilicate phosphor may further collocate with different color phosphors to provide a white light illumination device.

9 Claims, 19 Drawing Sheets

WHITE LIGHT ILLUMINATION DEVICE

BACKGROUND OF THE INVENTION

1. Field of the Invention

The present invention relates to an ultraviolet excitable aluminosilicate phosphor, and in particular relates to a white light illumination device utilizing the same.

2. Description of the Related Art

Commercially available white light illumination devices such as light emitting diodes (hereinafter LED), have gradually replaced conventional tungsten lamps or fluorescent lamps due to high luminescence efficiency and eco-friendliness. For white LEDs, the phosphor composition located within, is a critical factor determining luminescence efficiency, color rendering, color temperature, and lifespan of white LEDs.

In general, the excitation light source of conventional phosphors is a short wavelength ultraviolet light (UV) such as 147 nm, 172 nm, 185 nm, or 254 nm. The phosphors excited by the short wavelength UV have high light absorption and light transfer efficiency. Compared with phosphors excited by short wavelength UV, phosphors excited by long wavelength UV or visible light (250-470 nm) are rare.

In the field, conventional host materials in the phosphor are sulfides, nitrides, or oxides such as silicates or aluminates. Sulfides have high light transfer efficiency, but are unstable and easily degraded by moisture or oxygen. Meanwhile, nitrides are stable, but they are difficult to manufacture as nitrides require a high temperature/pressure condition, thus increasing costs and decreasing production yields. The properties of silicates and aluminates are suitable for white LEDs, however, wherein the preparation and application thereof are widely disclosed and discussed in several patents. Additionally, aluminosilicate phosphors are rarely utilized. Few aluminosilicate phosphors containing single activators are excited by vacuum UV or a cathode ray which can be applied in a plasma display or cathode ray tube. Most of the aluminosilicate phosphors, with co-dopant systems containing multi-activators, serve as afterglow phosphors (so-called light-storage materials). The application of aluminosilicate phosphors containing multi-activators excited by near UV (300-400 nm) has not been disclosed until now. Therefore, aluminosilicate phosphors excited by near UV to emit blue or blue-green light and collocate with other suitable phosphors to emit different colors to complete a white light illumination device are called for.

SUMMARY OF THE INVENTION

The invention provides a white light illumination device, comprising an ultraviolet excitation light source and an ultraviolet excitable aluminosilicate phosphor, wherein the ultraviolet excitable aluminosilicate phosphor has a formula as $(M_{1-x},Re_x)_aAl_bSi_cO_d$:D. M is Mg, Ca, Sr, Ba, or combinations thereof. Re is Y, La, Pr, Nd, Eu, Gd, Tb, Ce, Dy, Yb, Er, Sc, Mn, Zn, Cu, Ni, Lu, or combinations thereof. D is F, Cl, I, Br, OH, S, or combinations thereof. $0<a$, b, c, d. $0<a\leq 6$. $0<b\leq 18$. $0<c\leq 2$. $0<d\leq 37$. $2a+3b+4c=2d$. $0\leq x\leq 1$. D and $(M_{1-x},Re_x)_aAl_bSi_cO_d$ have a weight ratio of 0:100 to 30:100.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
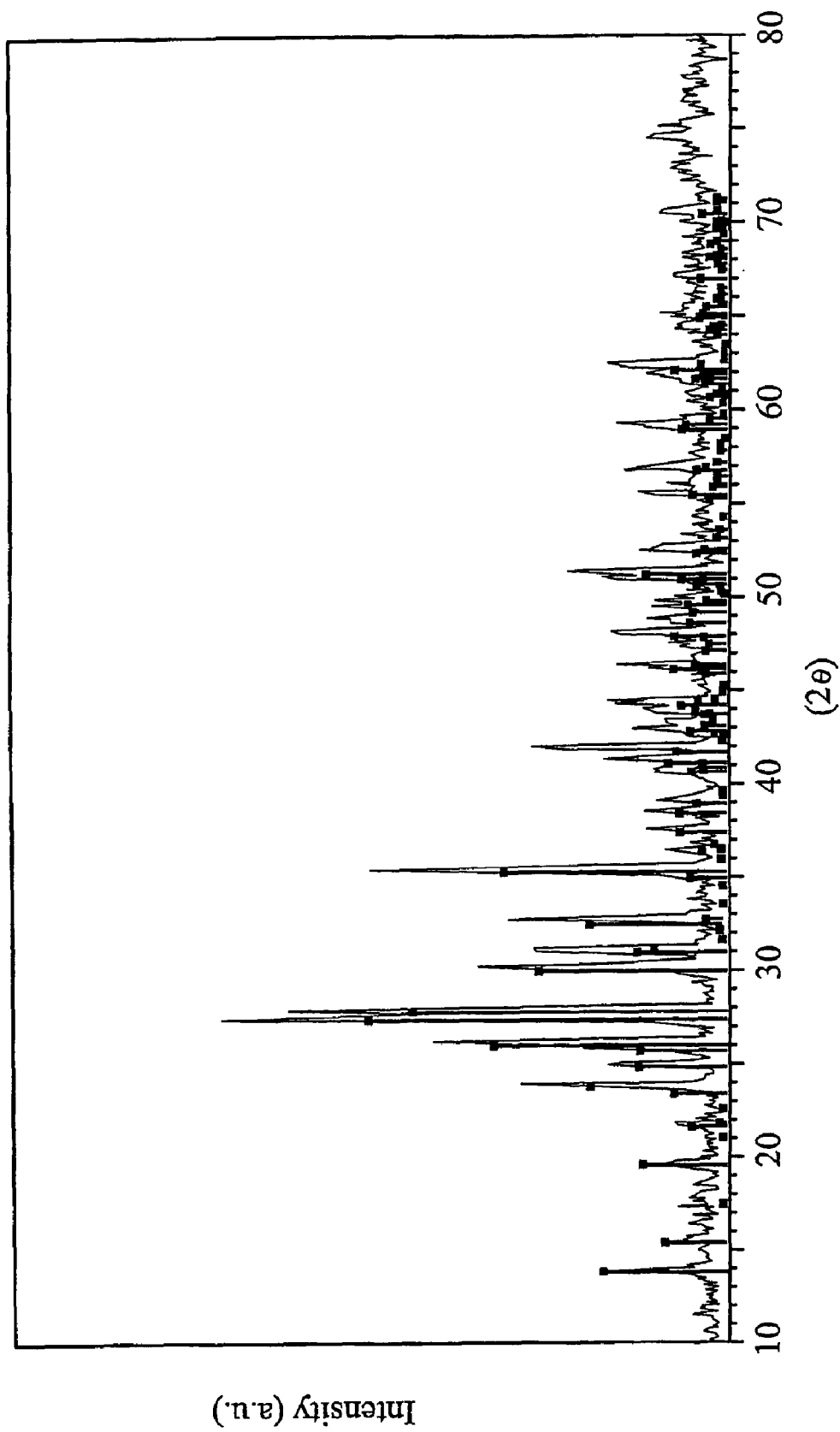
FIG. 1 shows the X-ray diffraction pattern of $(Sr_{0.95}, Eu_{0.05})Al_2Si_2O_8$ in Example 1 of the invention.

The following description is of the best-contemplated mode of carrying out the invention. This description is made for the purpose of illustrating the general principles of the invention and should not be taken in a limiting sense. The scope of the invention is best determined by reference to the appended claims.

The invention provides a white light illumination device, comprising an ultraviolet excitation light source and an ultraviolet excitable aluminosilicate phosphor, wherein the ultraviolet excitable aluminosilicate phosphor has a formula as $(M_{1-x},Re_x)_aAl_bSi_cO_d$:D. M is Mg, Ca, Sr, Ba, or combinations thereof. Re is Y, La, Pr, Nd, Eu, Gd, Tb, Ce, Dy, Yb, Er, Sc, Mn, Zn, Cu, Ni, Lu, or combinations thereof. D is F, Cl, I, Br, OH, S, or combinations thereof. $0<a$, b, c, d. $0<a\leq 6$. $0<b\leq 18$. $0<c\leq 2$. $0<d\leq 37$. $2a+3b+4c=2d$. $0\leq x\leq 1$. D and $(M_{1-x},Re_x)_aAl_bSi_cO_d$ have a weight ratio of 0:100 to 30:100. The ultraviolet excitable phosphor is alminosilicate, and it is different from conventional silicate or aluminate. The specific examples of the aluminosilicate includes $((Mg, Ca, Sr, Ba)_{1-x}, Eu_x)Al_2Si_2O_8$, $((Mg, Ca, Sr, Ba)_{1-x}, Eu_x)_2Al_2SiO_7$, $((Mg, Ca, Sr, Ba)_{1-x}, Eu_x)_6Al_{18}Si_2O_{37}$, $((Mg, Ca, Sr, Ba)_{1-x}, Eu_x)_3Al_{10}SiO_{20}$, $EuAl_2Si_2O_8$, $(Eu, Ce)Al_2Si_2O_8$, (Eu, Y)$Al_2Si_2O_8$, or $EuAl_2Si_2O_8$:Cl. In one example, the aluminosilicate has a formula as $(Sr_{0.9}, Eu_{0.1})Al_2Si_2O_8$, its excitation light source can be near UV (300-400 nm), and the preferable excitation wavelength is 370 nm UV. After excitation, $(Sr_{0.9}, Eu_{0.1})Al_2Si_2O_8$ may emit a blue light with major emission peak of about 415 nm, and the blue light has a CIE coordinates of (0.16, 0.11). In addition, the excitation light source of the blue phosphor can be a light-emitting diode or a laser diode to emit near UV.

The method for preparing the described aluminosilicate is sintering. First, the appropriate stoichiometry of reagents was weighted according to the element molar ratio of resulting aluminosilicate. The reagents containing Mg, Ca, Sr, Ba, or combinations thereof can be alkaline-earth oxides such as (Mg, Ca, Sr, Ba)O or alkaline-earth carbonates such as (Mg, Ca, Sr, Ba)$CO_3$. The aluminum-containing reagents can be aluminum hydroxide ($Al(OH)_3$), aluminum fluoride ($AlF_3$), aluminum carbonate ($Al_2(CO_3)_3$), or aluminum oxide ($Al_2O_3$). The silicon-containing reagents can be silicon dioxide ($SiO_2$) or silicon tetrachloride ($SiCl_4$). The europium-containing reagents can be europium oxide ($Eu_2O_3$) or europium chloride ($EuCl_2$). The described reagents were evenly mixed and grinded, and charged in a double-crucible. The double-crucible was then stuffed by graphite, and then heated in a high temperature furnace. After sintering at 1000-1450° C. for 8-12 hours, the described blue or blue-green phosphors were prepared.

In one example, the aluminosilicate has a formula as $EuAl_2Si_2O_8$, its excitation light source can be near UV (300-400 nm), and the preferable excitation wavelength is 370 nm UV. After excitation, $EuAl_2Si_2O_8$ may emit a blue-green light with major emission peak of about 489 nm. In addition, the excitation light source of the blue-green phosphor can be a light-emitting diode or a laser diode to emit near UV.

The method for preparing the described aluminosilicate is also sintering. First, the reagents of appropriate stoichiometry were weighted according to the element molar ratio of resulting aluminosilicate. The aluminum-containing reagents can be aluminum hydroxide ($Al(OH)_3$), aluminum fluoride ($AlF_3$), aluminum carbonate ($Al_2(CO_3)_3$), or aluminum oxide ($Al_2O_3$). The silicon-containing reagents can be silicon dioxide ($SiO_2$) or silicon tetrachloride ($SiCl_4$). The europium-containing reagents can be europium oxide ($Eu_2O_3$) or europium chloride ($EuCl_2$). The described reagents were evenly mixed and grinded, and charged in a double-crucible. The double-crucible was then stuffed by graphite, and then heated in a high temperature furnace. After sintering at 1000-1450° C. for 8-12 hours, the described blue-green phosphor was prepared.

In one example, the aluminosilicate has a formula as $(Eu_{0.9975}, Ce_{0.0025})Al_2Si_2O_8$, its excitation light source can be near UV (300-400 nm), and the preferable excitation wavelength is 370 nm UV. After excitation, $(Eu_{0.9975}, Ce_{0.0025})Al_2Si_2O_8$ may emit a blue-green light with major emission peak of about 490 nm. In addition, the excitation light source of the blue-green phosphor can be a light-emitting diode or a laser diode to emit near UV.

The method for prepare the described aluminosilicate is also sintering. First, the reagents of appropriate stoichiometry were weighted according to the element molar ratio of resulting aluminosilicate. The aluminum-containing reagents can be aluminum hydroxide ($Al(OH)_3$), aluminum fluoride ($AlF_3$), aluminum carbonate ($Al_2(CO_3)_3$), or aluminum oxide ($Al_2O_3$). The silicon-containing reagents can be silicon dioxide ($SiO_2$) or silicon tetrachloride ($SiCl_4$). The europium-containing reagents can be europium oxide ($Eu_2O_3$) or europium chloride ($EuCl_2$). The cerium-containing reagents can be cerium oxide ($CeO_2$) or cerium chloride ($CeCl_3$). The described reagents were evenly mixed and grinded, and charged in a double-crucible. The double-crucible was then stuffed by graphite, and then heated in a high temperature furnace. After sintering at 1000-1450° C. for 8-12 hours, the described blue-green phosphor was prepared.

In one example, the aluminosilicate has a formula as $(Eu_{0.9975}, Y_{0.0025})Al_2Si_2O_8$, its excitation light source can be near UV (300-400 nm), and the preferable excitation wavelength is 372 nm UV. After excitation, $(Eu_{0.9975}, Y_{0.0025})Al_2Si_2O_8$ may emit a blue-green light with major emission peak of about 478 nm. In addition, the excitation light source of the blue-green phosphor can be a light-emitting diode or a laser diode to emit near UV.

The method for prepare the described aluminosilicate is also sintering. First, the reagents of appropriate stoichiometry were weighted according to the element molar ratio of resulting aluminosilicate. The aluminum-containing reagents can be aluminum hydroxide ($Al(OH)_3$), aluminum fluoride ($AlF_3$), aluminum carbonate ($Al_2(CO_3)_3$), or aluminum oxide ($Al_2O_3$). The silicon-containing reagents can be silicon dioxide ($SiO_2$) or silicon tetrachloride ($SiCl_4$). The europium-containing reagents can be europium oxide ($Eu_2O_3$) or europium chloride ($EuCl_2$). The yttrium-containing reagents can be yttrium oxide ($Y_2O_3$), yttrium carbonate ($Y_2(CO_3)_3.3H_2O$), or yttrium sulfate ($Y_2(SO_4)_3$). The described reagents were evenly mixed and grinded, and charged in a double-crucible. The double-crucible was then stuffed by graphite, and then heated in a high temperature furnace. After sintering at 1000-1450° C. for 8-12 hours, the described blue-green phosphor was prepared.

In one example, the aluminosilicate has a formula as $EuAl_2Si_2O_8$:Cl, wherein the Cl and $EuAl_2Si_2O_8$ have a preferable weight ratio of 10:100. The excitation light source for the aluminosilicate can be near UV (300-400 nm), and the preferable excitation wavelength is 370 nm UV. After excitation, $EuAl_2Si_2O_8$:Cl may emit a blue-green light with major emission peak of about 490 nm. In addition, the excitation light source of the blue-green phosphor can be a light-emitting diode or a laser diode to emit near UV.

The method for prepare the described aluminosilicate is also sintering. First, the reagents of appropriate stoichiometry were weighted according to the element molar ratio of resulting aluminosilicate. The aluminum-containing reagents can be aluminum hydroxide ($Al(OH)_3$), aluminum fluoride ($AlF_3$), aluminum carbonate ($Al_2(CO_3)_3$), or aluminum oxide ($Al_2O_3$). The silicon-containing reagents can be silicon dioxide ($SiO_2$) or silicon tetrachloride ($SiCl_4$). The europium-containing reagents can be europium oxide ($Eu_2O_3$) or europium chloride ($EuCl_2$). The chlorine-containing reagents can be sodium chloride (NaCl), potassium chloride (KCl), europium chloride ($EuCl_2$), aluminum chloride ($AlCl_3$), or strontium chloride ($SrCl_2$). The described reagents were evenly mixed and grinded, and charged in a double-crucible. The double-crucible was then stuffed by graphite, and then heated in a high temperature furnace. After sintering at 1000-1450° C. for 8-12 hours, the described blue-green phosphor was prepared.

The ultraviolet excitable aluminosilicate phosphor may collocate with a near UV or blue light excitable yellow phosphor. Arranged with an ultraviolet excitation light source such as a light-emitting diode or laser diode, a white light emitting diode or white laser diode is completed. The described yellow phosphor includes $Y_3Al_5O_{12}$:$Ce^{3+}$ (YAG), $Tb_3Al_5O_{12}$:$Ce^{3+}$ (TAG), (Mg, Ca, Sr, Ba)$_2SiO_4$:$Eu^{2+}$, and other suitable yellow phosphor. If the yellow phosphor is near UV excitable, the yellow phosphor is directly excited by an excitation light source such as a light emitting diode or laser diode. If the yellow phosphor is blue light excitable, the yellow phosphor is indirectly excited by blue light. The blue light is emitted from the aluminosilicate phosphor excited by an excitation light source such as a light emitting diode or laser diode. The combination and ratio of blue and yellow phosphors are optional in different applications of direct or indirect excitation.

For improving the color rendering, the near UV excitable blue or blue-green phosphor of the invention may collocate with near UV or blue light excitable red and green phosphors. Arranged with an ultraviolet excitation light source such as a light-emitting diode or laser diode, a white light emitting diode or white laser diode is completed. The red phosphor includes $(Sr, Ca)S:Eu^{2+}$, $(Y, La, Gd, Lu)_2O_3:(Eu^{3+}, Bi^{3+})$, $(Y, La, Gd, Lu)_2O_2S:(Eu^{3+}, Bi^{3+})$, $Ca_2Si_4N_8:Eu^{2+}$, $ZnCdS:AgCl$, or other suitable red phosphors. The green phosphor includes $BaMgAl_{10}O_{17}:(Eu^{2+},Mn^{2+})$, $SrGa_2S_4:Eu^{2+}$, $(Ca, Sr, Ba)Al_2O_4:(Eu^{2+}, Mn^{2+})$, $(Ca, Sr, Ba)_4Al_{14}O_{25}:Eu^{2+}$, or $Ca_8Mg(SiO_4)_4Cl_2:(Eu^{2+}, Mn^{2+})$, or other suitable green phosphors. Similar to yellow phosphor, the red and green phosphor can be divided into being directly or indirectly excitable. If the red or green phosphor is near UV excitable, the red or green phosphor is directly excited by an excitation light source such as a light emitting diode or laser diode. If the red or green phosphor is blue light excitable, the red or green phosphor is indirectly excited by blue light. The blue light is emitted from the aluminosilicate phosphor excited by an excitation light source such as a light emitting diode or laser diode. The combination and ratio of red, green, and blue phosphors are optional in different applications of direct or indirect excitation.

In the white light illumination device such as described, a white light emitting diode or white laser diode, and the blue/yellow or red/green/blue phosphors can be evenly mixed in preferable ratio and dispersed in an optical gel. The optical gel containing the phosphors may further seal a near UV excitation light source such as a chip of a light emitting diode or a laser diode. Note that if UV is selected as the excitation light source, an UV filter or other UV insulator should be arranged externally from the white light illumination device to protect user's eyes and skin.

EXAMPLES

Example 1

According to molar ratio of $(Sr_{0.95}, Eu_{0.05})Al_2Si_2O_8$, appropriate stoichiometry of $SrCO_3$ (commercially available from Aldrich Chemicals Company Inc. in U.S.A., 99.9%, FW=147.63), $Al_2O_3$ (commercially available from Aldrich Chemicals Company Inc. in U.S.A., 99.99%, FW=101.96), $SiO_2$ (commercially available from AHA, 1.5 μm, 99.9%, FW=60.08), and $EuCl_2$ (commercially available from Aldrich Chemicals Company Inc. in U.S.A., 99.99%, FW=222.87) were evenly mixed and grinded, and charged in a double-crucible. The double-crucible was then stuffed by graphite, and then heated in a high temperature furnace. After sintering at 1000-1450° C. for 8-12 hours, pure phase of the aluminosilicate phosphor $(Sr_{0.95}, Eu_{0.05})Al_2Si_2O_8$ was prepared. The X-ray diffraction pattern of the described product is shown in FIG. 1.

Example 2

Figure 2:
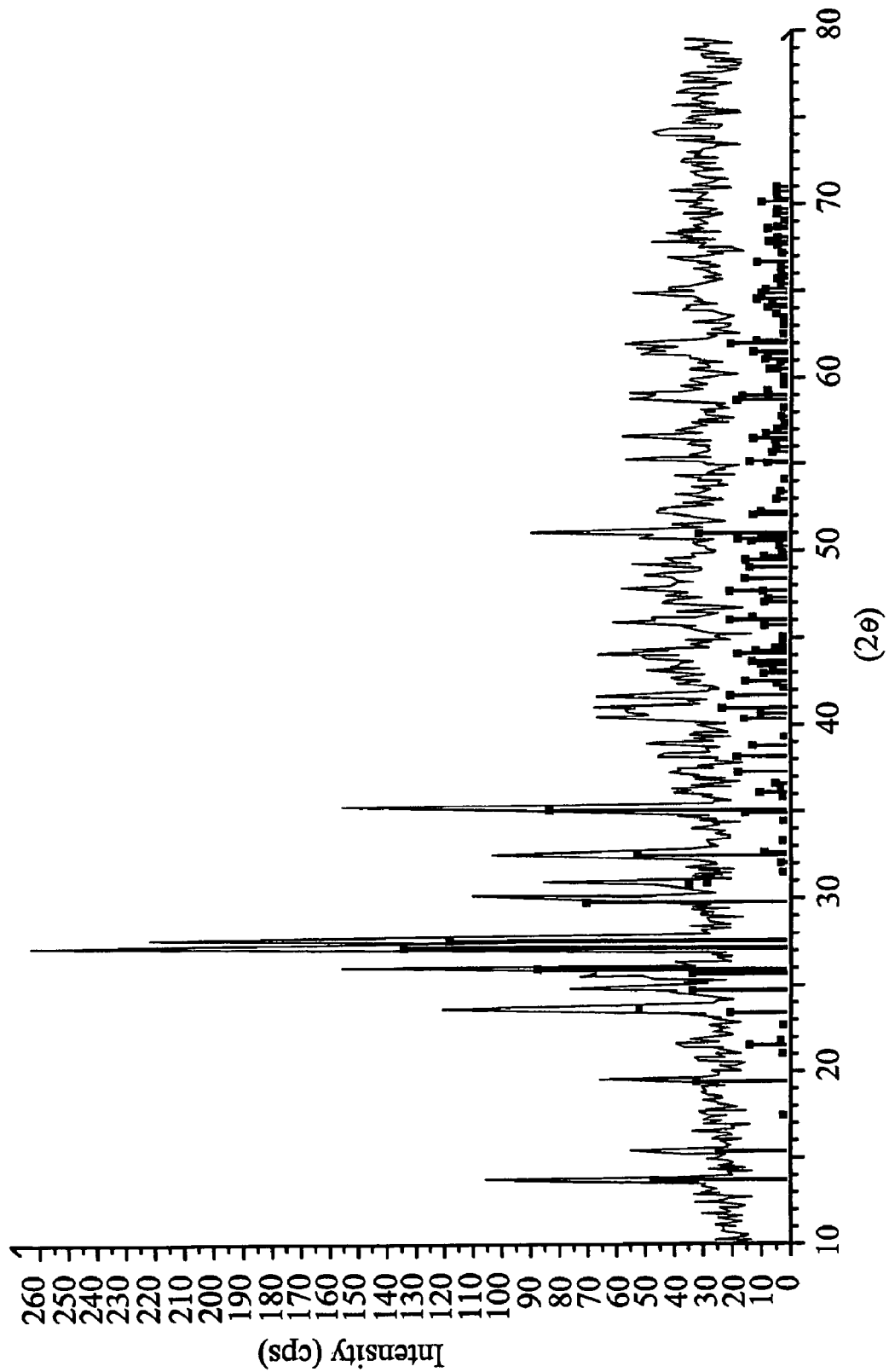
FIG. 2 shows the X-ray diffraction pattern of $(Sr_{0.8}, Eu_{0.2})Al_2Si_2O_8$ in Example 2 of the invention.

According to molar ratio of $(Sr_{0.8}, Eu_{0.2})Al_2Si_2O_8$, appropriate stoichiometry of $SrCO_3$ (commercially available from Aldrich Chemicals Company Inc. in U.S.A., 99.9%, FW=147.63), $Al_2O_3$ (commercially available from Aldrich Chemicals Company Inc. in U.S.A., 99.99%, FW=101.96), $SiO_2$ (commercially available from AHA, 1.5 μm, 99.9%, FW=60.08), and $EuCl_2$ (commercially available from Aldrich Chemicals Company Inc. in U.S.A., 99.99%, FW=222.87) were evenly mixed and grinded, and charged in a double-crucible. The double-crucible was then stuffed by graphite, and then heated in a high temperature furnace. After sintering at 1000-1450° C. for 8-12 hours, pure phase of the aluminosilicate phosphor $(Sr_{0.8}, Eu_{0.2})Al_2Si_2O_8$ was prepared. The X-ray diffraction pattern of the described product is shown in FIG. 2.

Example 3

Figure 3:
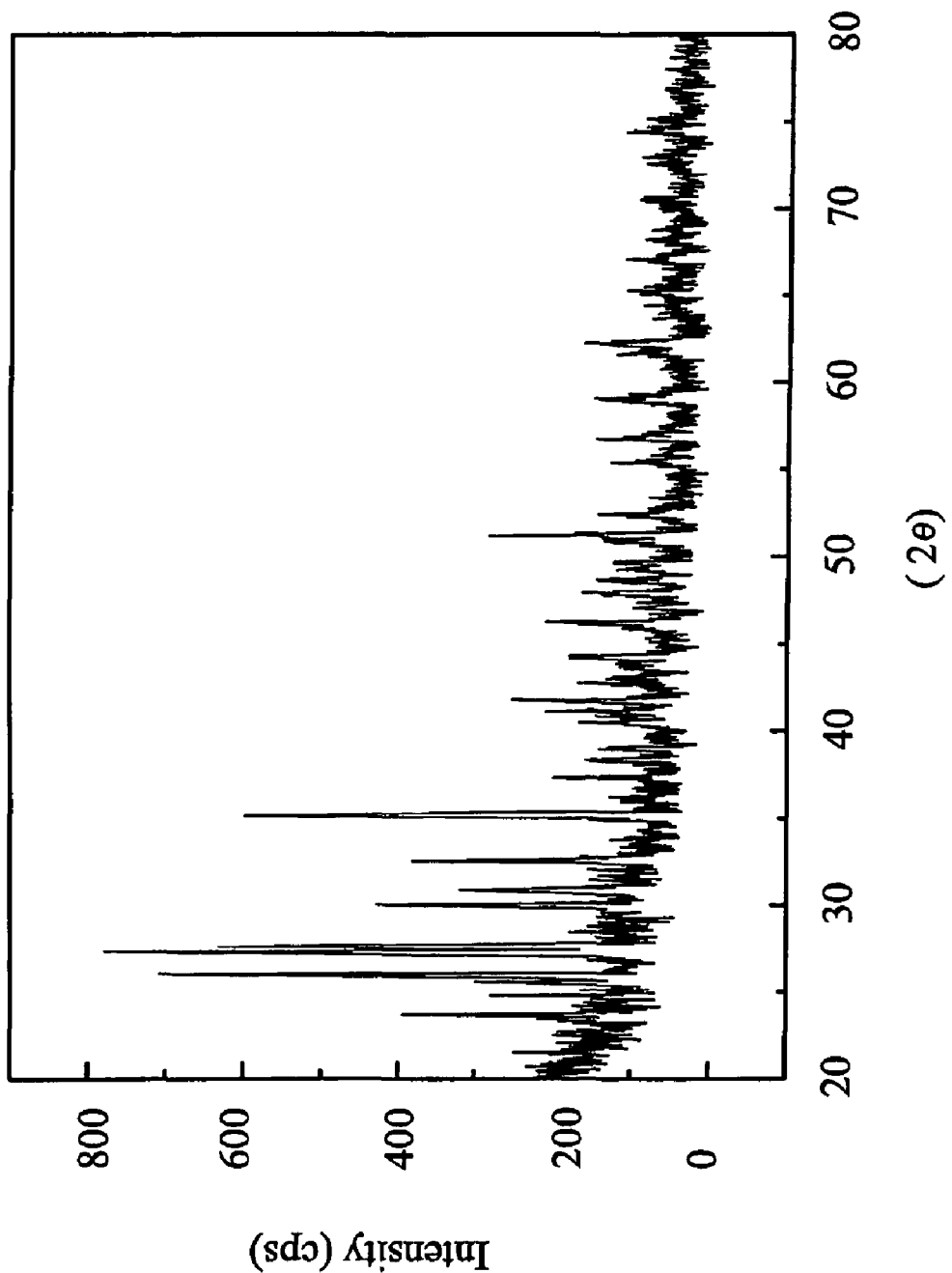
FIG. 3 shows the X-ray diffraction pattern of $(Sr_{0.9}, Eu_{0.1})Al_2Si_2O_8$ in Example 3 of the invention.
Figure 4:
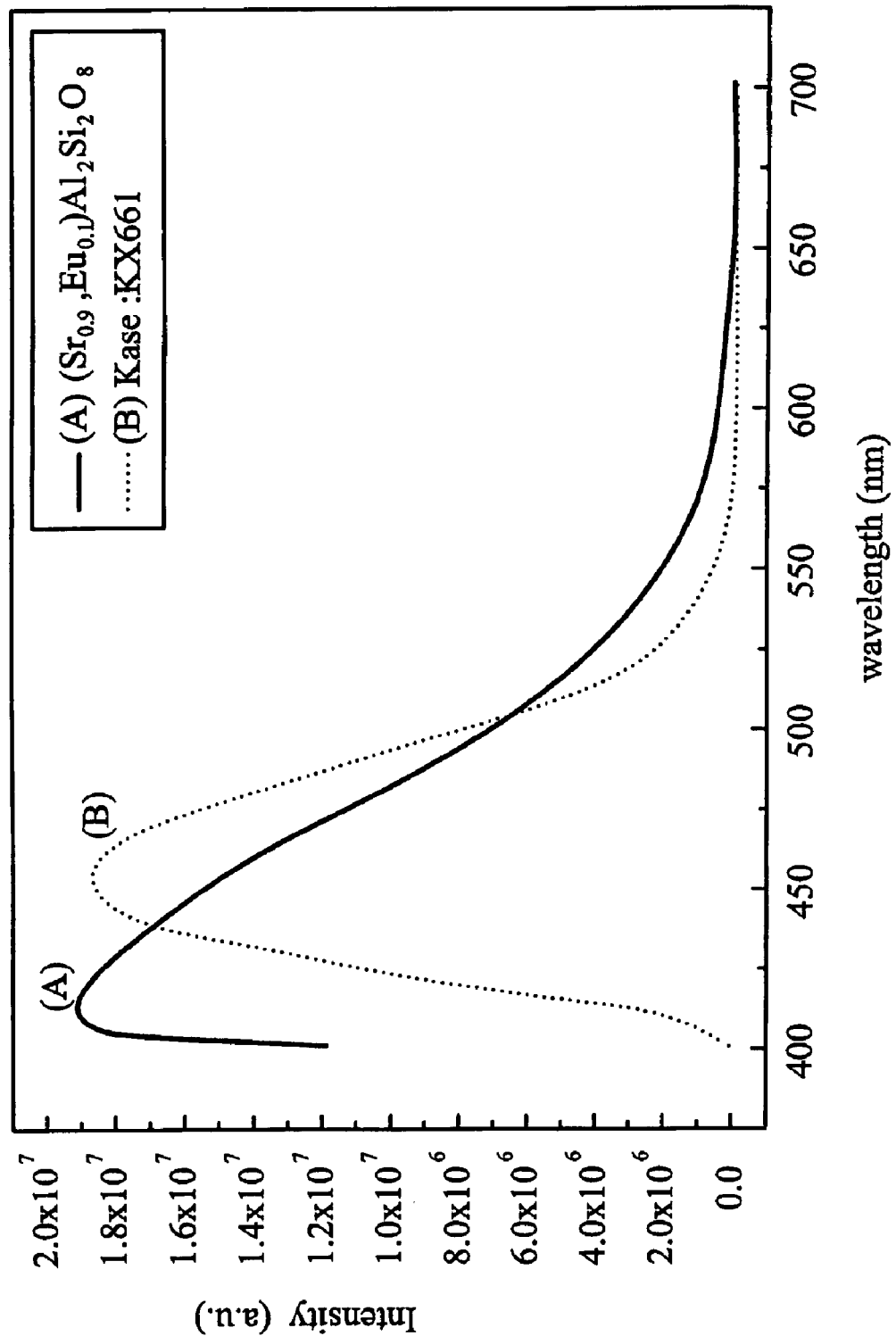
FIG. 4 shows the photoluminescence comparison spectrum of a commercial available product and $(Sr_{0.9}, Eu_{0.1})Al_2Si_2O_8$ in Example 3 of the invention.
Figure 5:
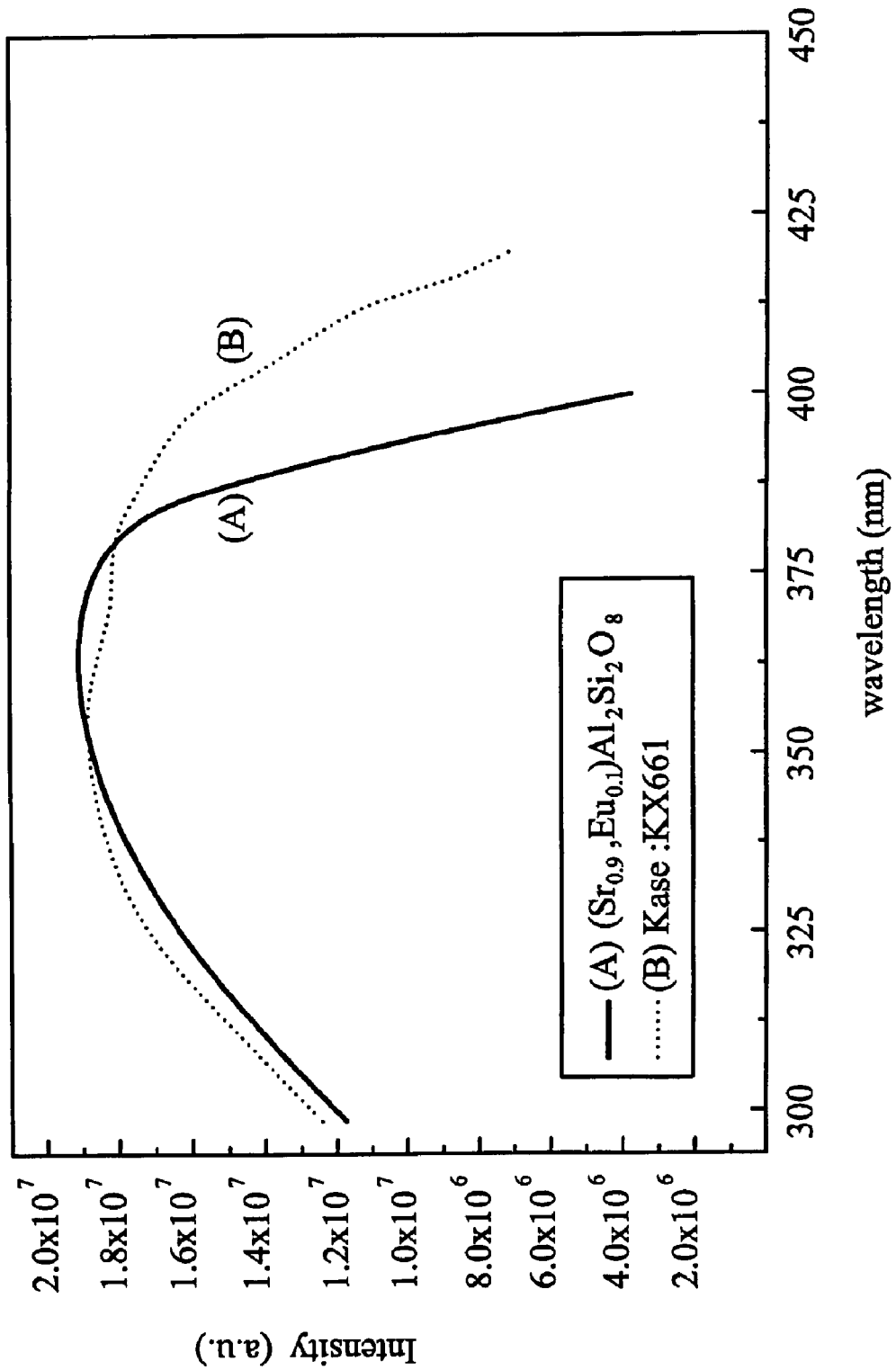
FIG. 5 shows the excitation comparison spectrum of a commercial available product and $(Sr_{0.9}, Eu_{0.1})Al_2Si_2O_8$ in Example 3 of the invention.
Figure 6:
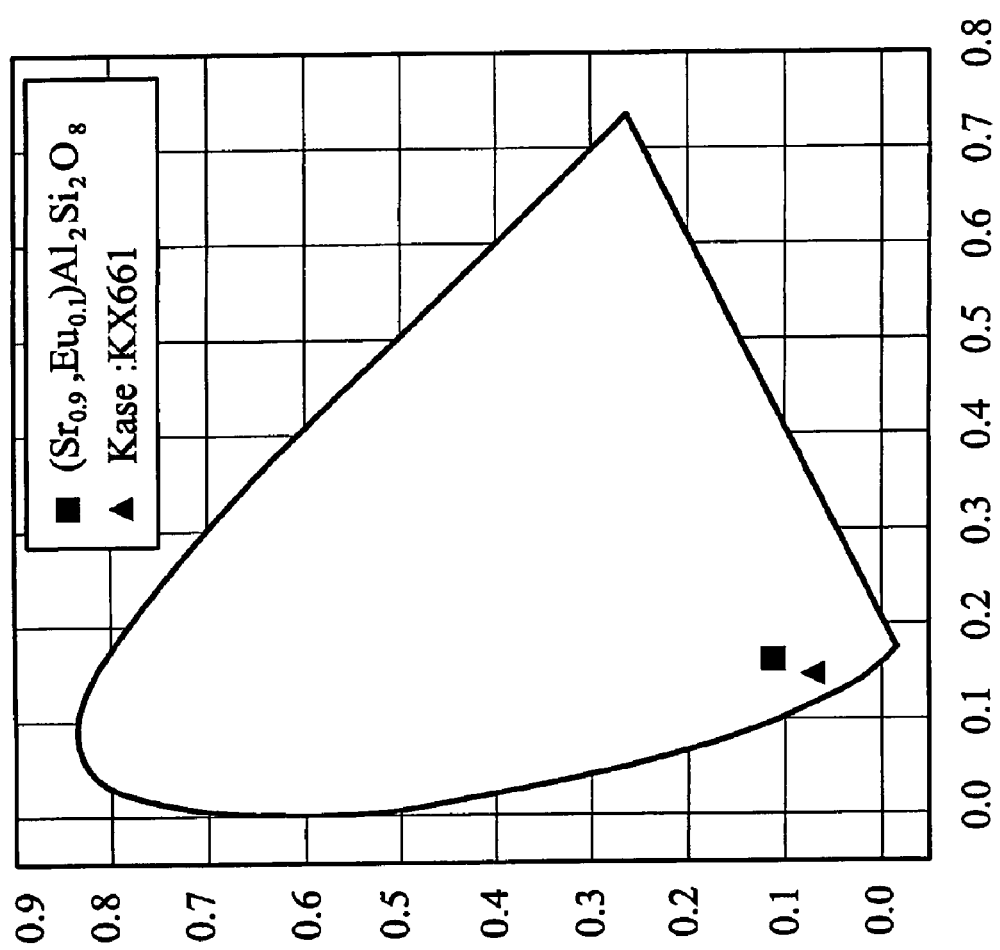
FIG. 6 shows the CIE coordination comparison diagram of a commercial available product and $(Sr_{0.9}, Eu_{0.1})Al_2Si_2O_8$ in Example 3 of the invention.
Figure 7:
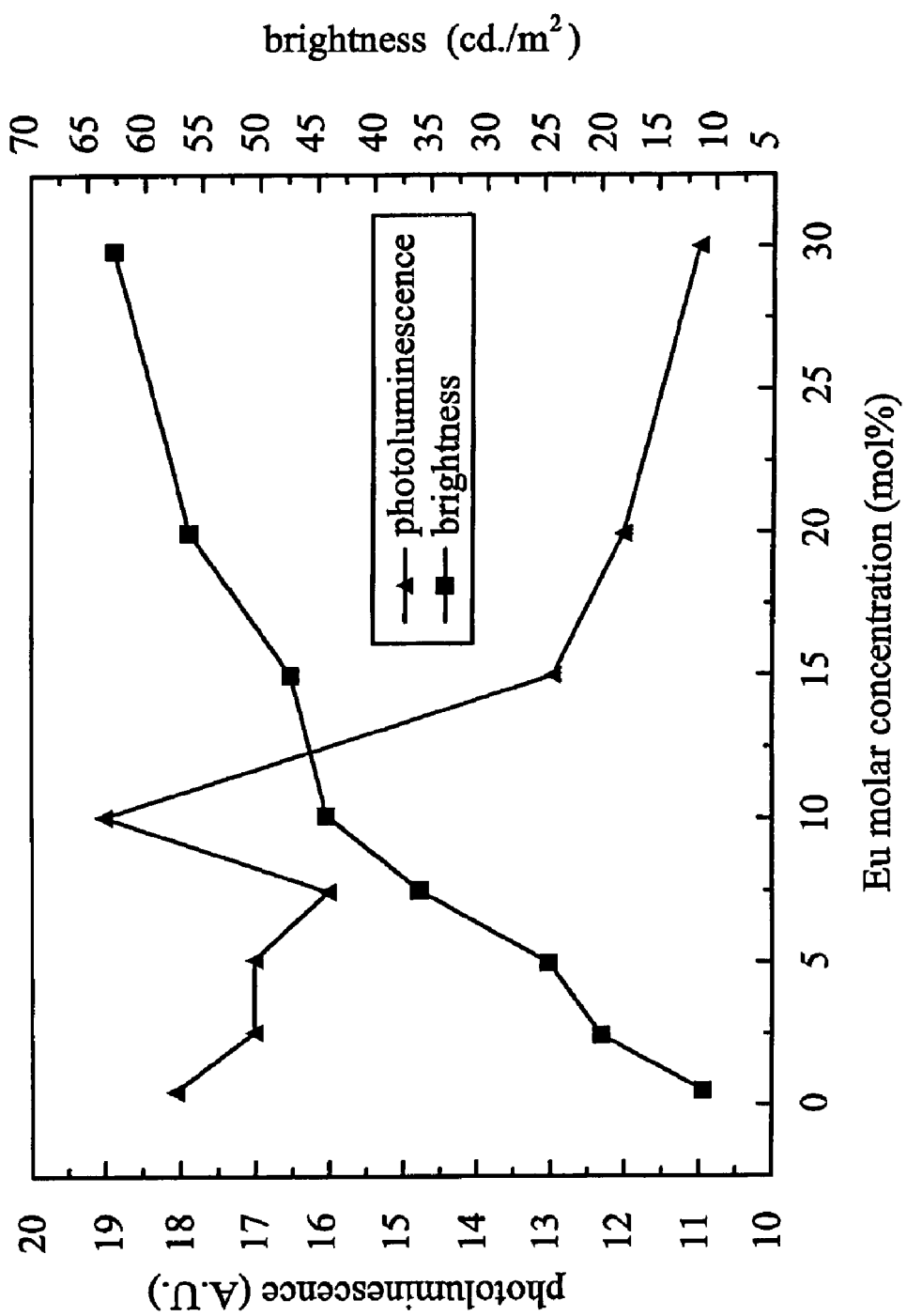
FIG. 7 shows the brightness and photoluminescence intensity comparison diagram of $(Sr_{1-x}, Eu_x)Al_2Si_2O_8$ with different x ratio in Example 3 of the invention.

According to molar ratio of $(Sr_{0.9}, Eu_{0.1})Al_2Si_2O_8$, appropriate stoichiometry of $SrCO_3$ (commercially available from Aldrich Chemicals Company Inc. in U.S.A., 99.9%, FW=147.63), $Al_2O_3$ (commercially available from Aldrich Chemicals Company Inc. in U.S.A., 99.99%, FW=101.96), $SiO_2$ (commercially available from AHA, 1.5 μm, 99.9%, FW=60.08), and $EuCl_2$ (commercially available from Aldrich Chemicals Company Inc. in U.S.A., 99.99%, FW=222.87) were evenly mixed and grinded, and charged in a double-crucible. The double-crucible was then stuffed by graphite, and then heated in a high temperature furnace. After sintering at 1000-1450° C. for 8-12 hours, pure phase of the aluminosilicate phosphor $(Sr_{0.9}, Eu_{0.1})Al_2Si_2O_8$ was prepared. The X-ray diffraction pattern of the described product is shown in FIG. 3. Compared with the Kasei KX661 ($BaMgAl_{10}O_{17}:Eu^{2+}$ commercially available from Kasei in Japan), the aluminosilicate phosphor $(Sr_{0.9}, Eu_{0.1})Al_2Si_2O_8$ has shorter major emission peak (415 nm) and shorter excitation band (370 nm). Both of the aluminosilicate phosphor $(Sr_{0.9}, Eu_{0.1})Al_2Si_2O_8$ and Kasei KX661 ($BaMgAl_{10}O_{17}:Eu^{2+}$) emit blue light, however, CIE coordinates still exist difference. The photoluminescence comparison spectrum, the excitation comparison spectrum, and the CIE coordinates comparison diagram of Kasei KX661 ($BaMgAl_{10}O_{17}:Eu^{2+}$ and $(Sr_{0.9}, Eu_{0.1})Al_2Si_2O_8$ are shown in FIGS. 4-6, respectively. FIG. 7 further shows the brightness and photoluminescence intensity comparison diagram of $(Sr_{1-x}, Eu_x)Al_2Si_2O_8$ with different x ratio. The brightness is enhanced by increasing the $Eu^{2+}$ ratio, however, x is preferably 10 wt % when considering photoluminescence intensity. Notes that FIG. 7 just shows the influence of x ratio in $(Sr_{1-x}, Eu_x)Al_2Si_2O_8$, the x ratio of other aluminosilicate phosphor $(M_{1-x},Re_x)_aAl_bSi_cO_d:D$ is determined by the sorting of M, RE, and D and not limited to the preferable ratio in FIG. 7.

Example 4

According to molar ratio of $(Sr_{0.95}, Eu_{0.05})_6Al_{18}Si_2O_{37}$, appropriate stoichiometry of $SrCO_3$ (commercially available from Aldrich Chemicals Company Inc. in U.S.A., 99.9%, FW=147.63), $Al_2O_3$ (commercially available from Aldrich Chemicals Company Inc. in U.S.A., 99.99%, FW=101.96), $SiO_2$ (commercially available from AHA, 1.5 μm, 99.9%, FW=60.08), and $EuCl_2$ (commercially available from Aldrich Chemicals Company Inc. in U.S.A., 99.99%, FW=222.87) were evenly mixed and grinded, and charged in a double-crucible. The double-crucible was then stuffed by graphite, and then heated in a high temperature furnace. After sintering at 1000-1450° C. for 8-12 hours, pure phase of the aluminosilicate phosphor $(Sr_{0.95}, Eu_{0.05})_6Al_{18}Si_2O_{37}$ was prepared.

Figure 8:
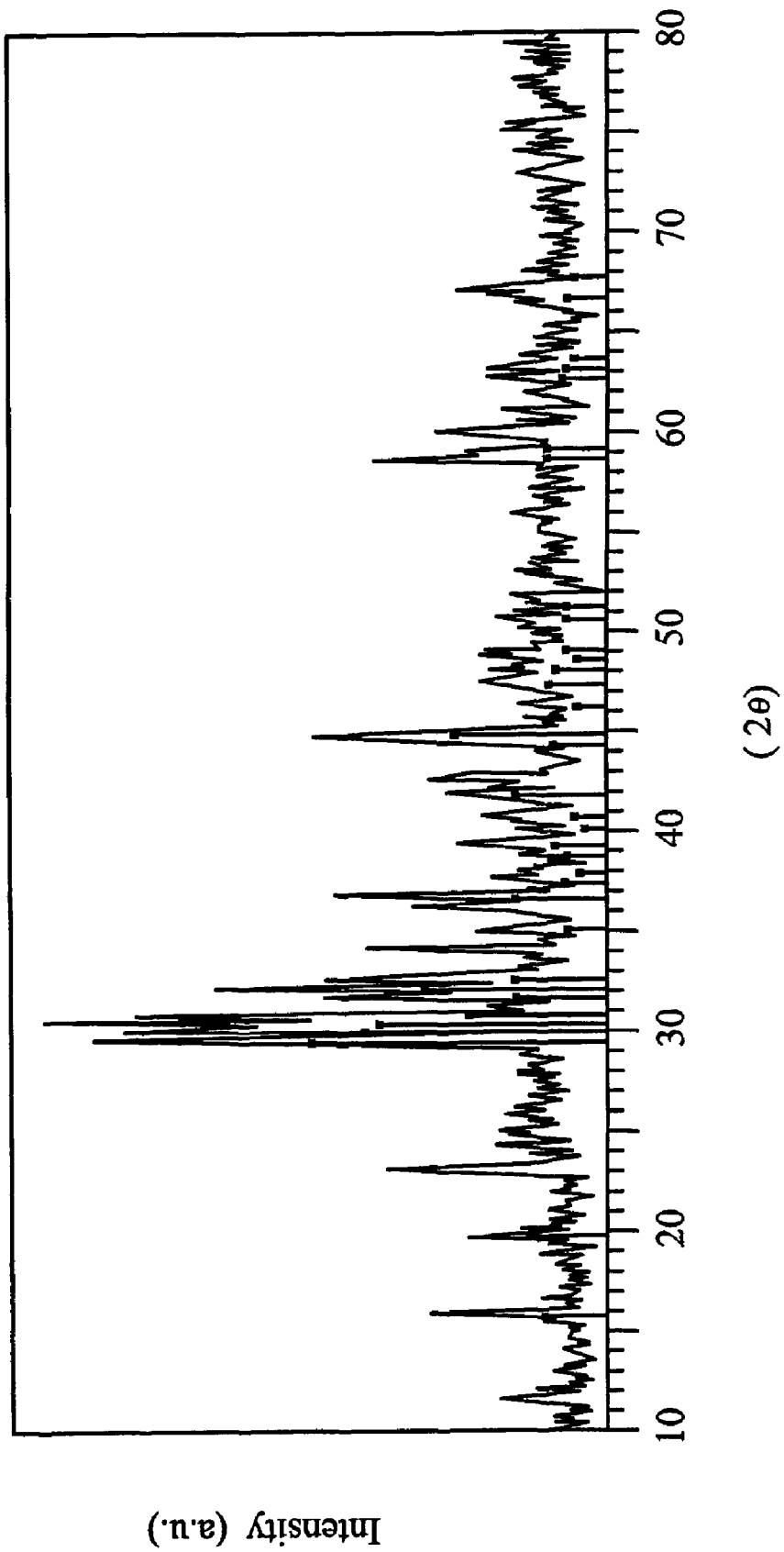
FIG. 8 shows the X-ray diffraction pattern of $(Sr_{0.95}, Eu_{0.05})_6Al_{18}Si_2O_{37}$ in Example 4 of the invention.
Figure 9:
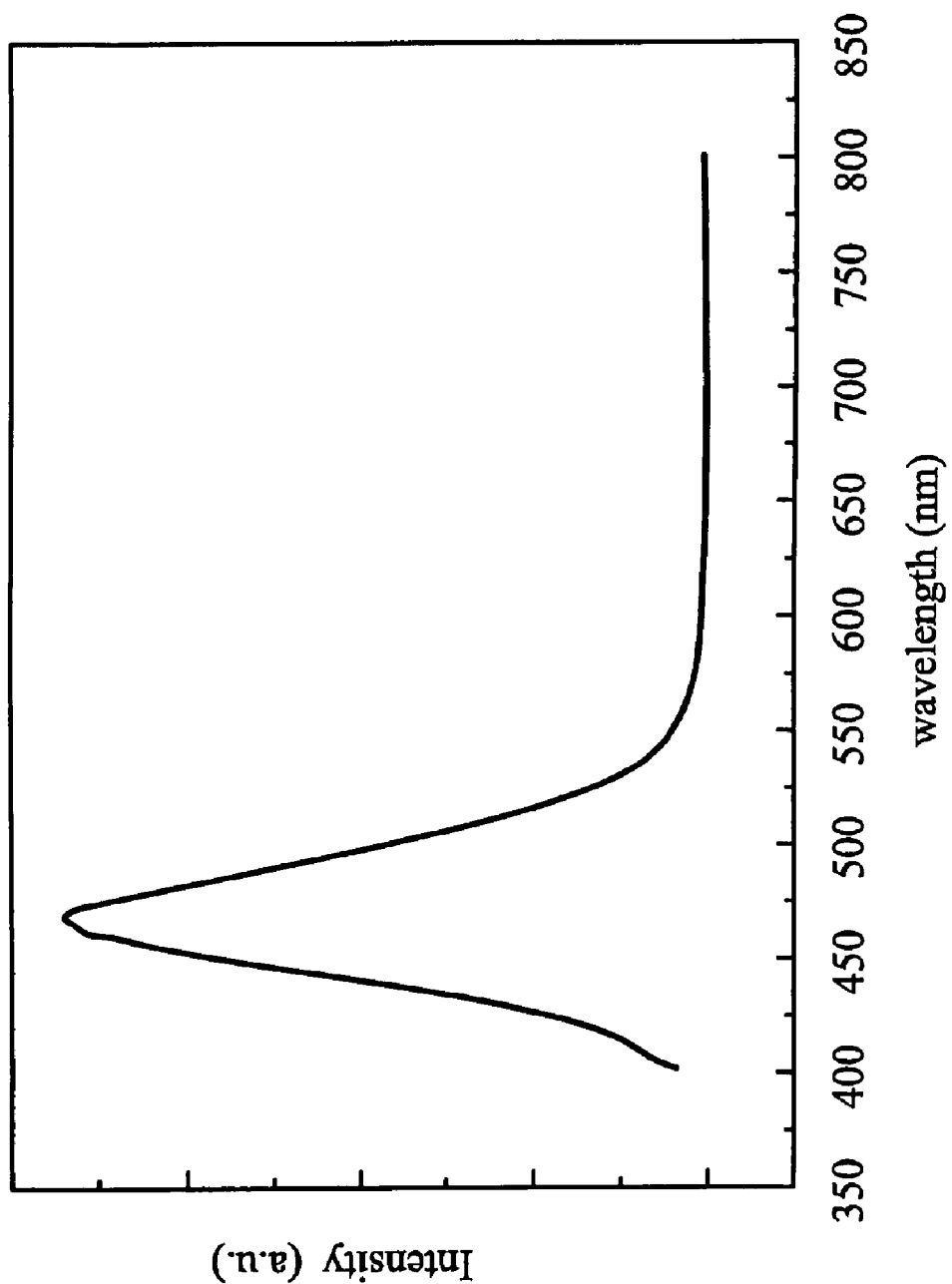
FIG. 9 shows the emission spectrum of $(Sr_{0.95}, Eu_{0.05})_6Al_{18}Si_2O_{37}$ in Example 4 of the invention.
Figure 10:
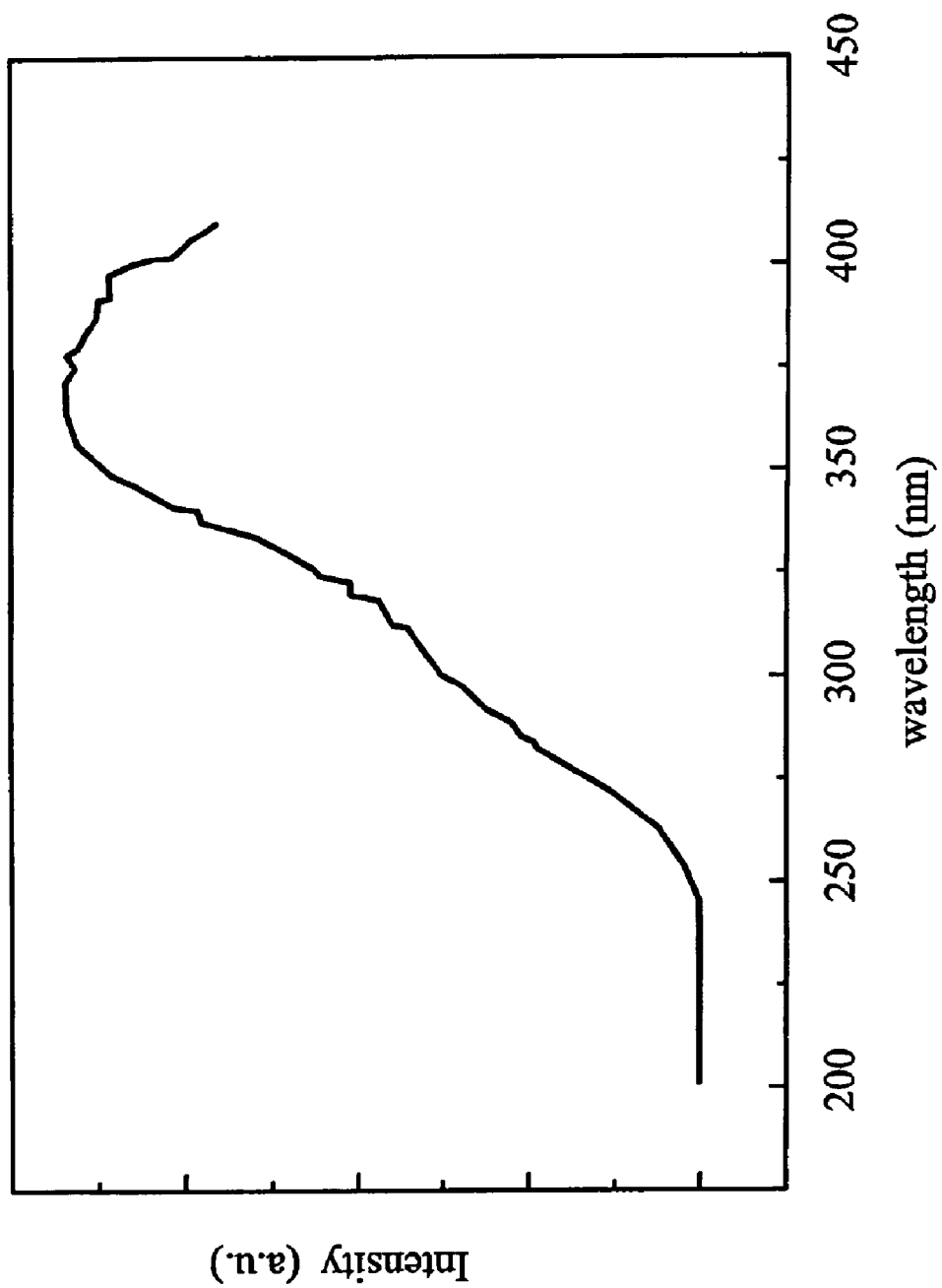
FIG. 10 shows the excitation spectrum of $(Sr_{0.95}, Eu_{0.05})_6Al_{18}Si_2O_{37}$ in Example 4 of the invention.

The X-ray diffraction pattern, the emission spectrum, and the excitation spectrum of the described product are shown in FIGS. 8-10, respectively.

Example 5

Figure 11:
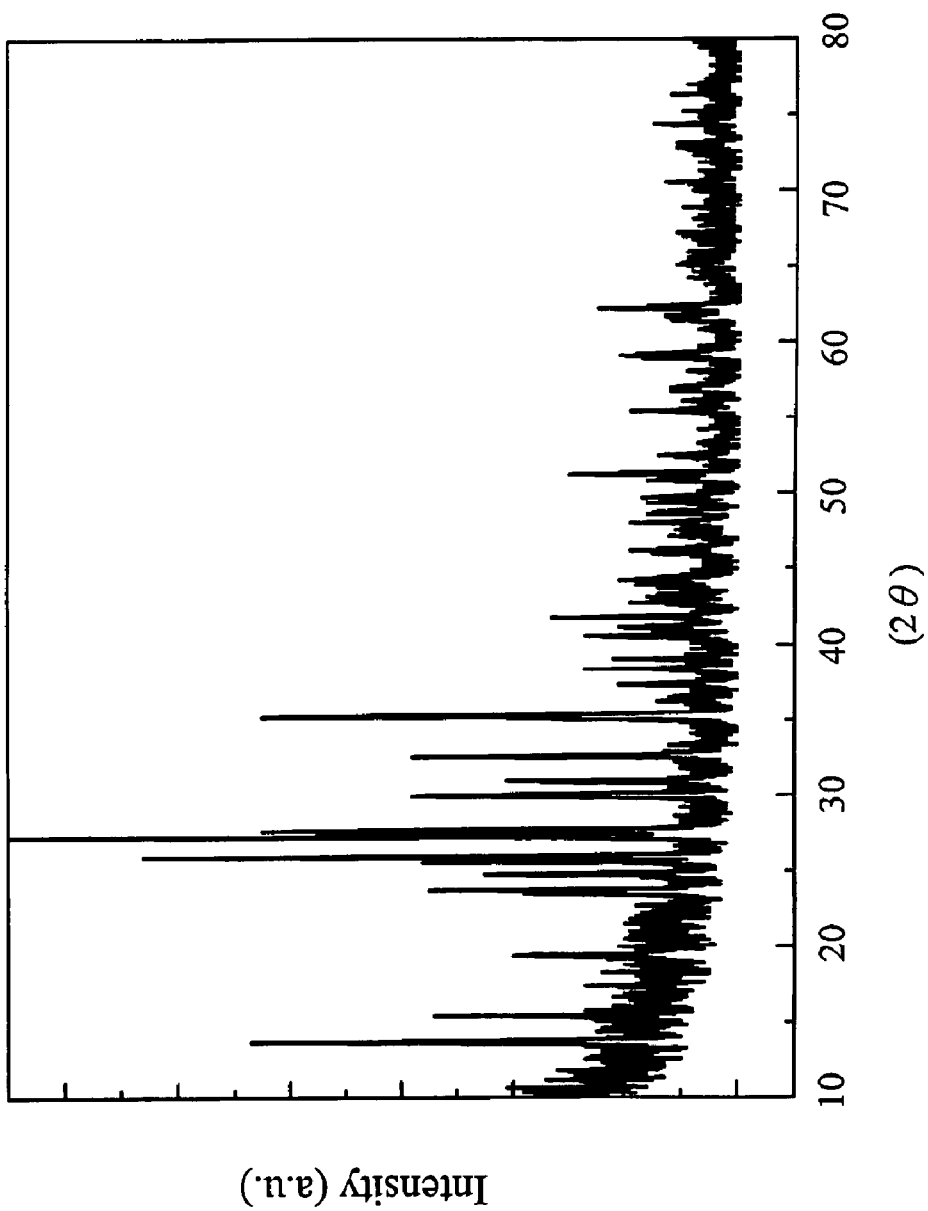
FIG. 11 shows the X-ray diffraction pattern of $EuAl_2Si_2O_8$ in Example 5 of the invention.
Figure 12:
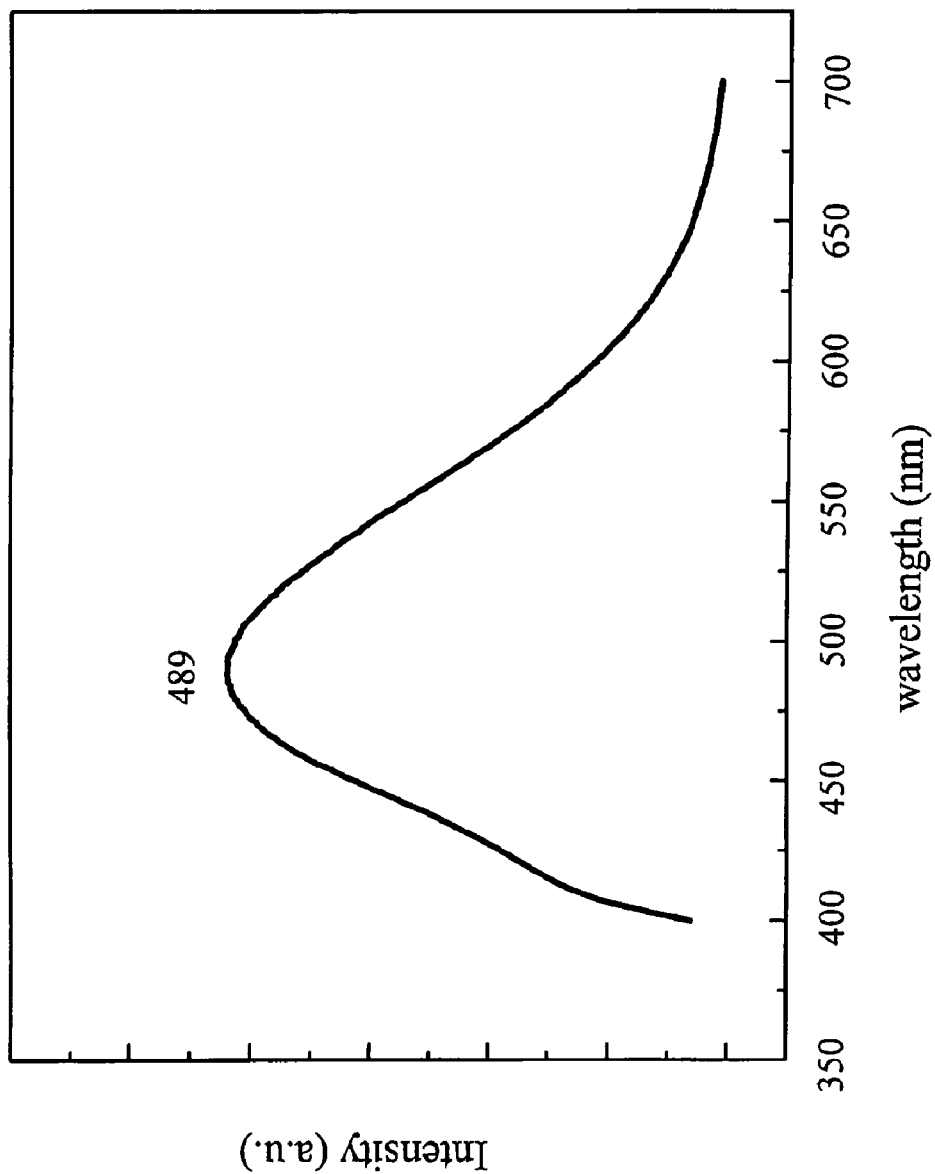
FIG. 12 shows the emission spectrum of $EuAl_2Si_2O_8$ in Example 5 of the invention.
Figure 13:
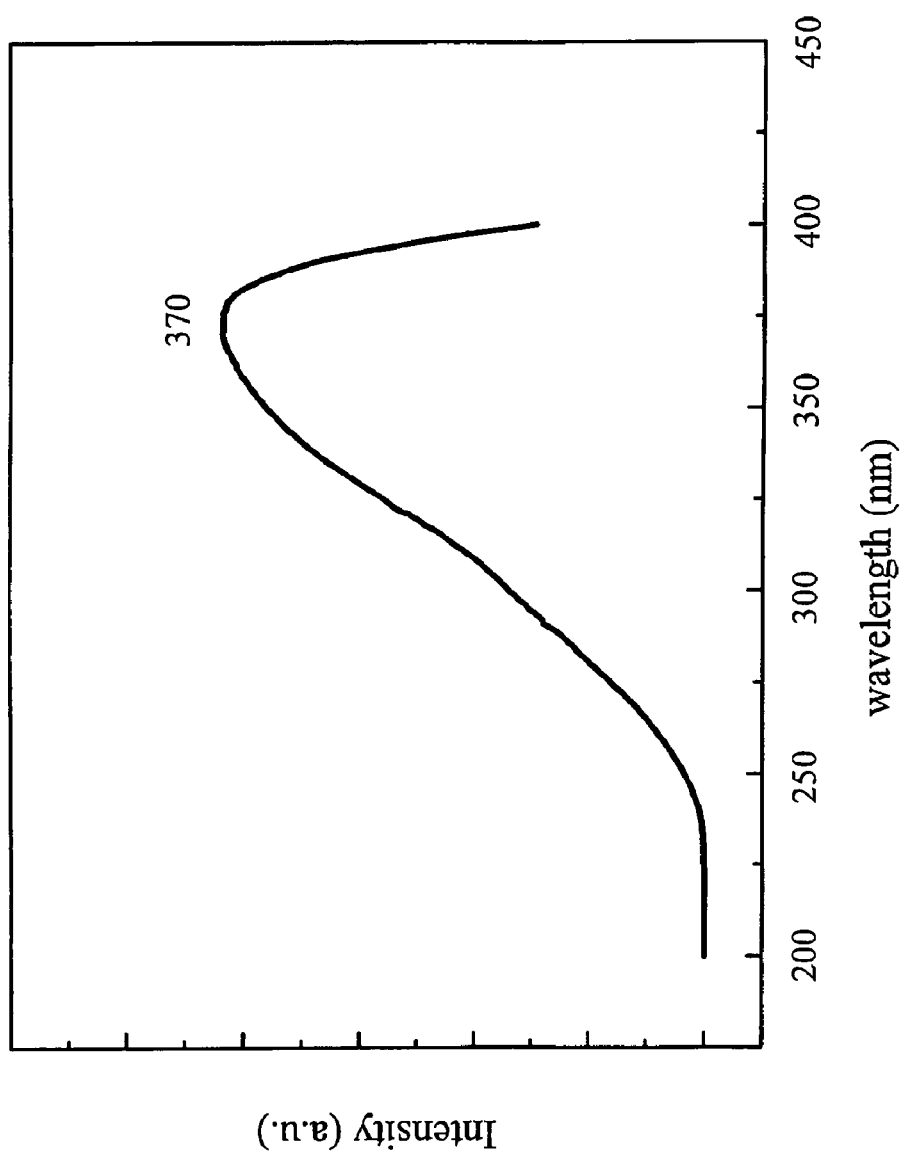
FIG. 13 shows the excitation spectrum of $EuAl_2Si_2O_8$ in Example 5 of the invention.

According to molar ratio of $EuAl_2Si_2O_8$, appropriate stoichiometry of $Al_2O_3$ (commercially available from Aldrich Chemicals Company Inc. in U.S.A., 99.99%, FW=101.96), $SiO_2$ (commercially available from AHA, 1.5 µm, 99.9%, FW=60.08), and $EuCl_2$ (commercially available from Aldrich Chemicals Company Inc. in U.S.A., 99.99%, FW=222.87) were evenly mixed and grinded, and charged in a double-crucible. The double-crucible was then stuffed by graphite, and then heated in a high temperature furnace. After sintering at 1000-1450° C. for 8-12 hours, pure phase of the aluminosilicate phosphor $EuAl_2Si_2O_8$ was prepared. The X-ray diffraction pattern, the emission spectrum, and the excitation spectrum of the described product are shown in FIGS. 11-13, respectively.

Example 6

Figure 14:
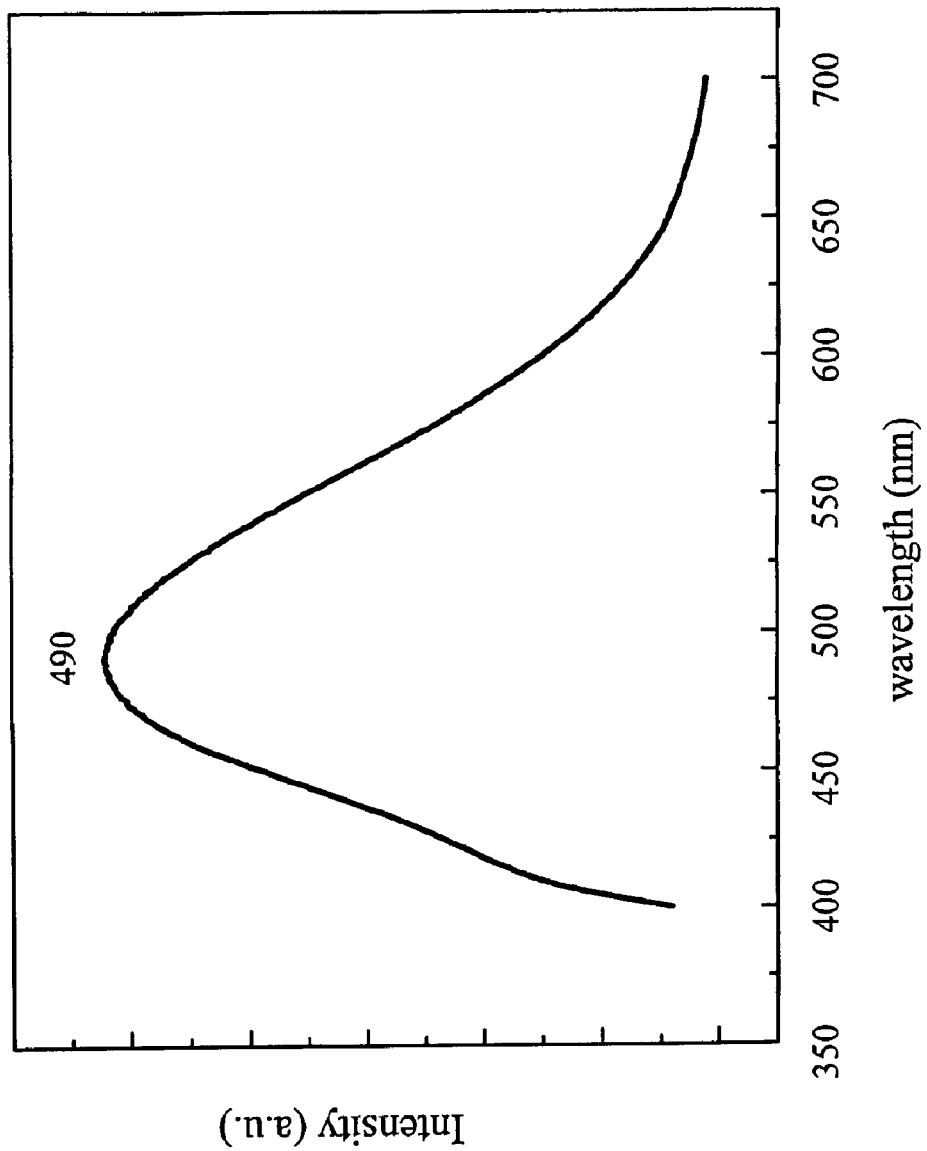
FIG. 14 shows the emission spectrum of $(Eu_{0.9975}, Ce_{0.0025})Al_2Si_2O_8$ in Example 6 of the invention.
Figure 15:
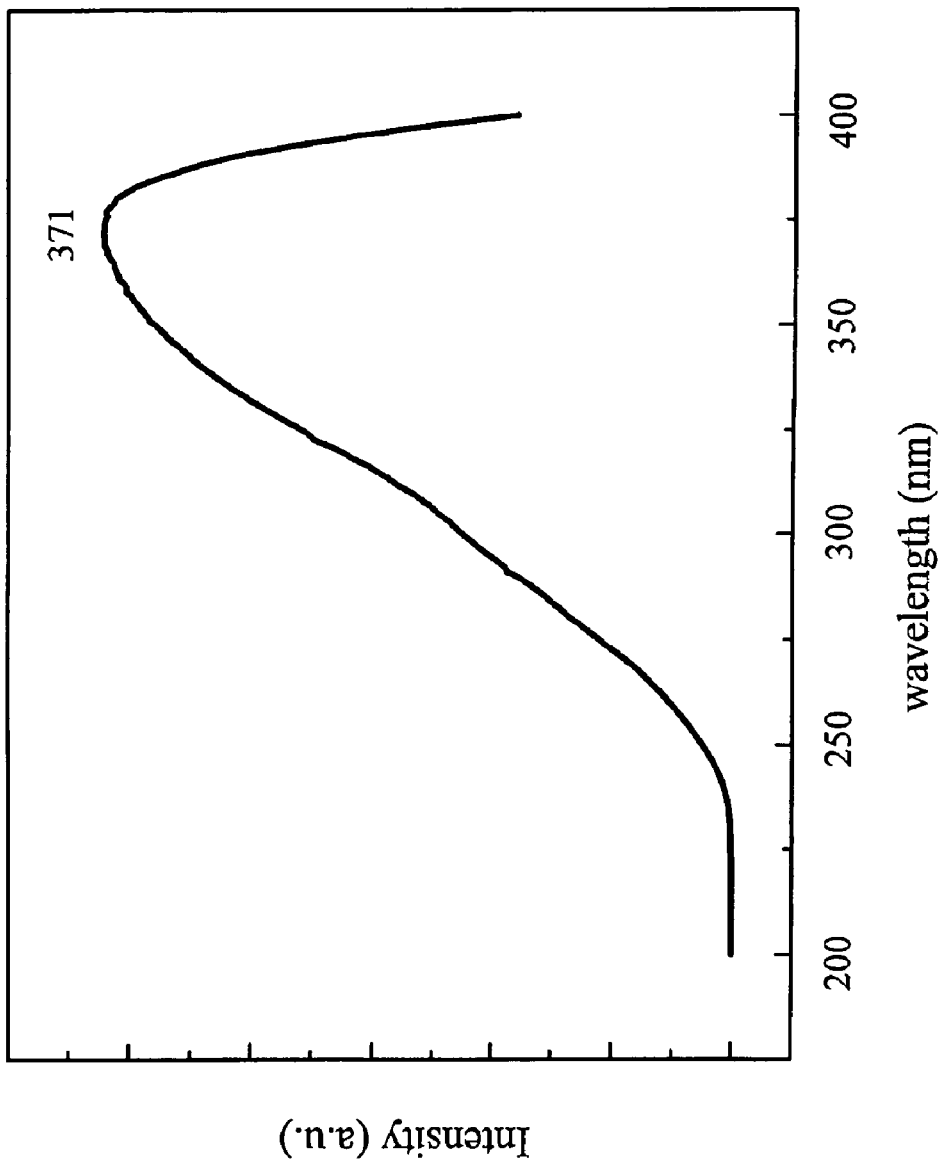
FIG. 15 shows the excitation spectrum of $(Eu_{0.9975}, Ce_{0.0025})Al_2Si_2O_8$ in Example 6 of the invention.

According to molar ratio of $(Eu_{0.9975}, Ce_{0.0025})Al_2Si_2O_8$, appropriate stoichiometry of $Al_2O_3$ (commercially available from Aldrich Chemicals Company Inc. in U.S.A., 99.99%, FW=101.96), $SiO_2$ (commercially available from AHA, 1.5 µm, 99.9%, FW=60.08), $EuCl_2$ (commercially available from Aldrich Chemicals Company Inc. in U.S.A., 99.99%, FW=222.87), and $CeO_2$ (commercially available from Aldrich Chemicals Company Inc. in U.S.A., 99.99%, FW=172.11) were evenly mixed and grinded, and charged in a double-crucible. The double-crucible was then stuffed by graphite, and then heated in a high temperature furnace. After sintering at 1000-1450° C. for 8-12 hours, pure phase of the aluminosilicate phosphor $(Eu_{0.9975}, Ce_{0.0025})Al_2Si_2O_8$ was prepared. The emission spectrum and the excitation spectrum of the described product are shown in FIGS. 14-15, respectively.

Example 7

Figure 16:
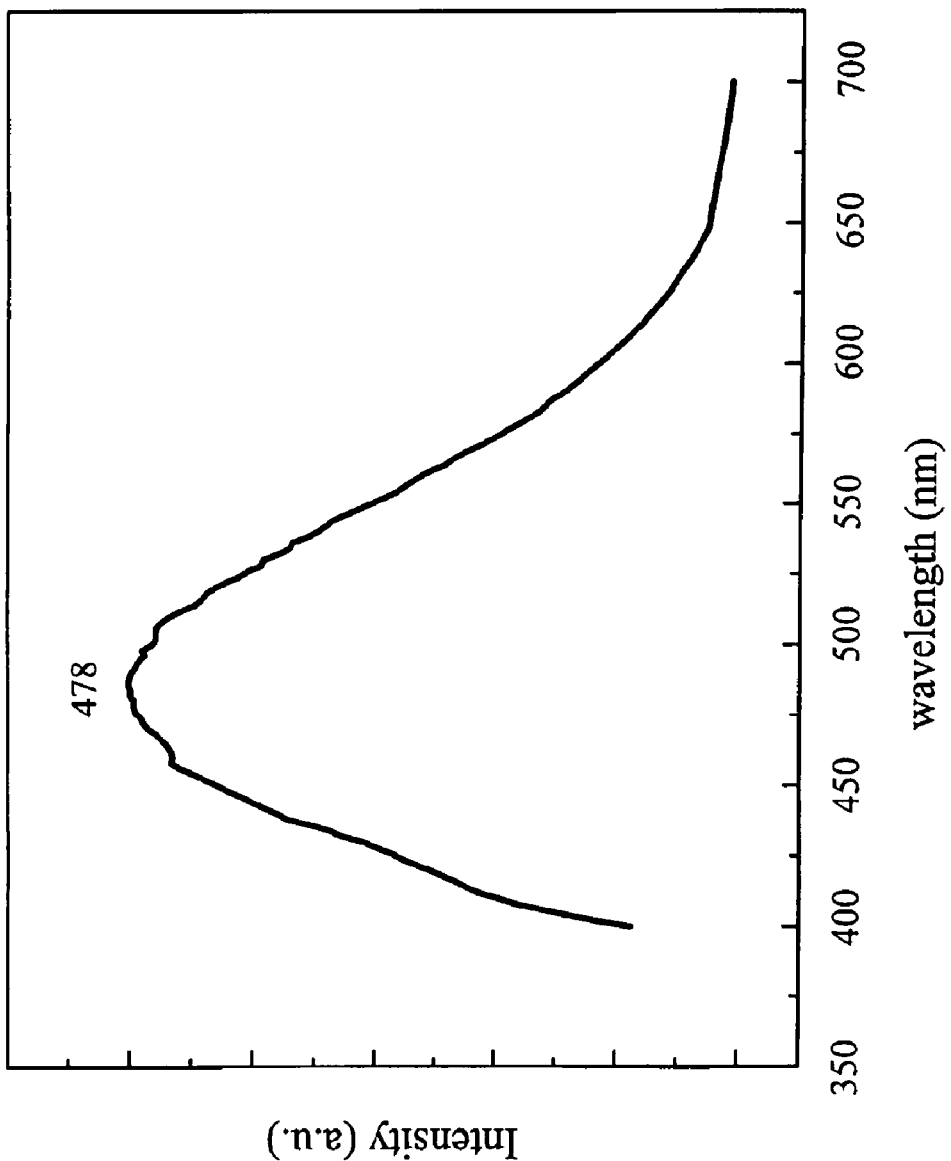
FIG. 16 shows the emission spectrum of $(Eu_{0.9975}, Y_{0.0025})Al_2Si_2O_8$ in Example 7 of the invention.
Figure 17:
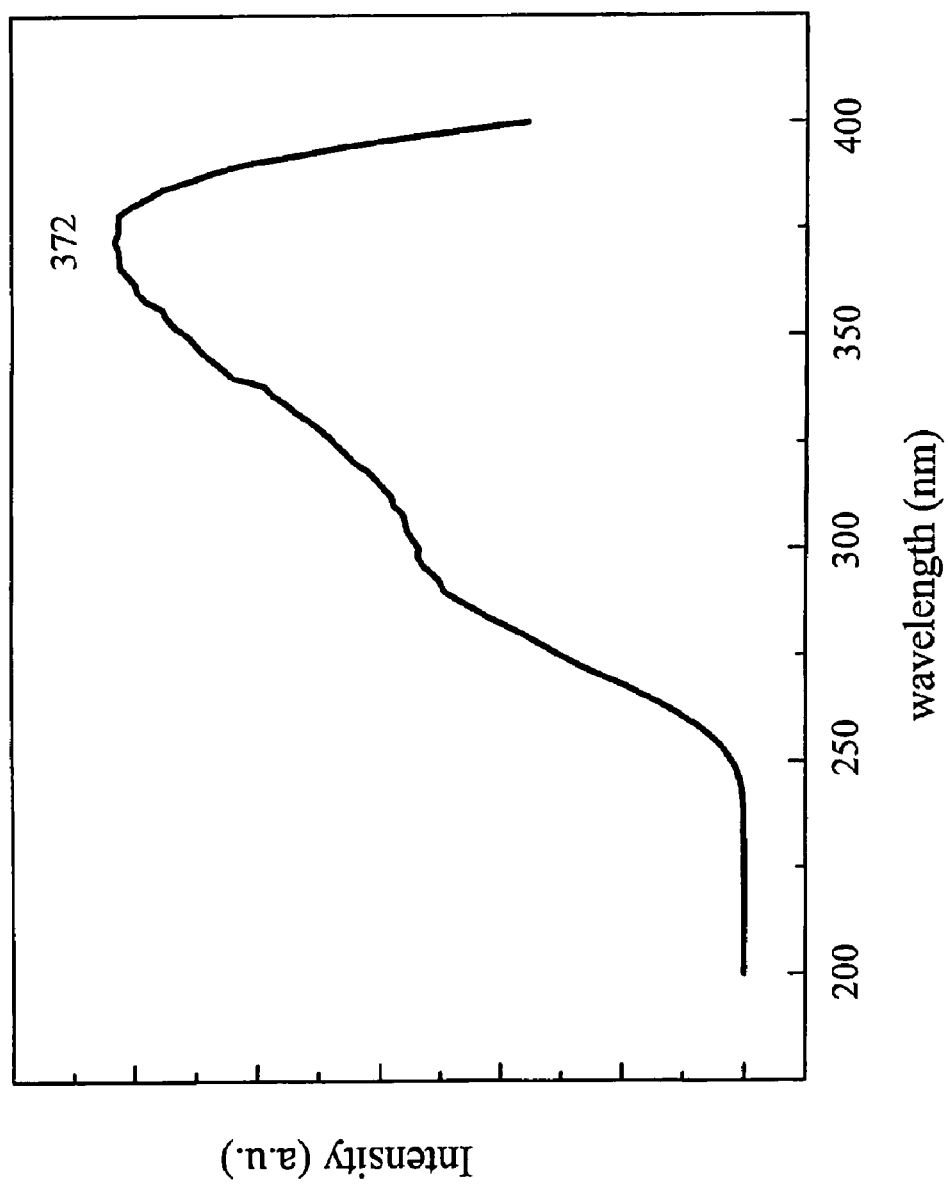
FIG. 17 shows the excitation spectrum of $(Eu_{0.9975}, Y_{0.0025})Al_2Si_2O_8$ in Example 7 of the invention.

According to molar ratio of $(Eu_{0.9975}, Y_{0.0025})Al_2Si_2O_8$, appropriate stoichiometry of $Al_2O_3$ (commercially available from Aldrich Chemicals Company Inc. in U.S.A., 99.99%, FW=101.96), $SiO_2$ (commercially available from AHA, 1.5 µm, 99.9%, FW=60.08), $EuCl_2$ (commercially available from Aldrich Chemicals Company Inc. in U.S.A., 99.99%, FW=222.87), and $Y_2O_3$ (commercially available from Aldrich Chemicals Company Inc. in U.S.A., 99.99%, FW=225.81) were evenly mixed and grinded, and charged in a double-crucible. The double-crucible was then stuffed by graphite, and then heated in a high temperature furnace. After sintering at 1000-1450° C. for 8-12 hours, pure phase of the aluminosilicate phosphor $(Eu_{0.9975}, Y_{0.0025})Al_2Si_2O_8$ was prepared. The emission spectrum and the excitation spectrum of the described product are shown in FIGS. 16-17, respectively.

Example 8

Figure 18:
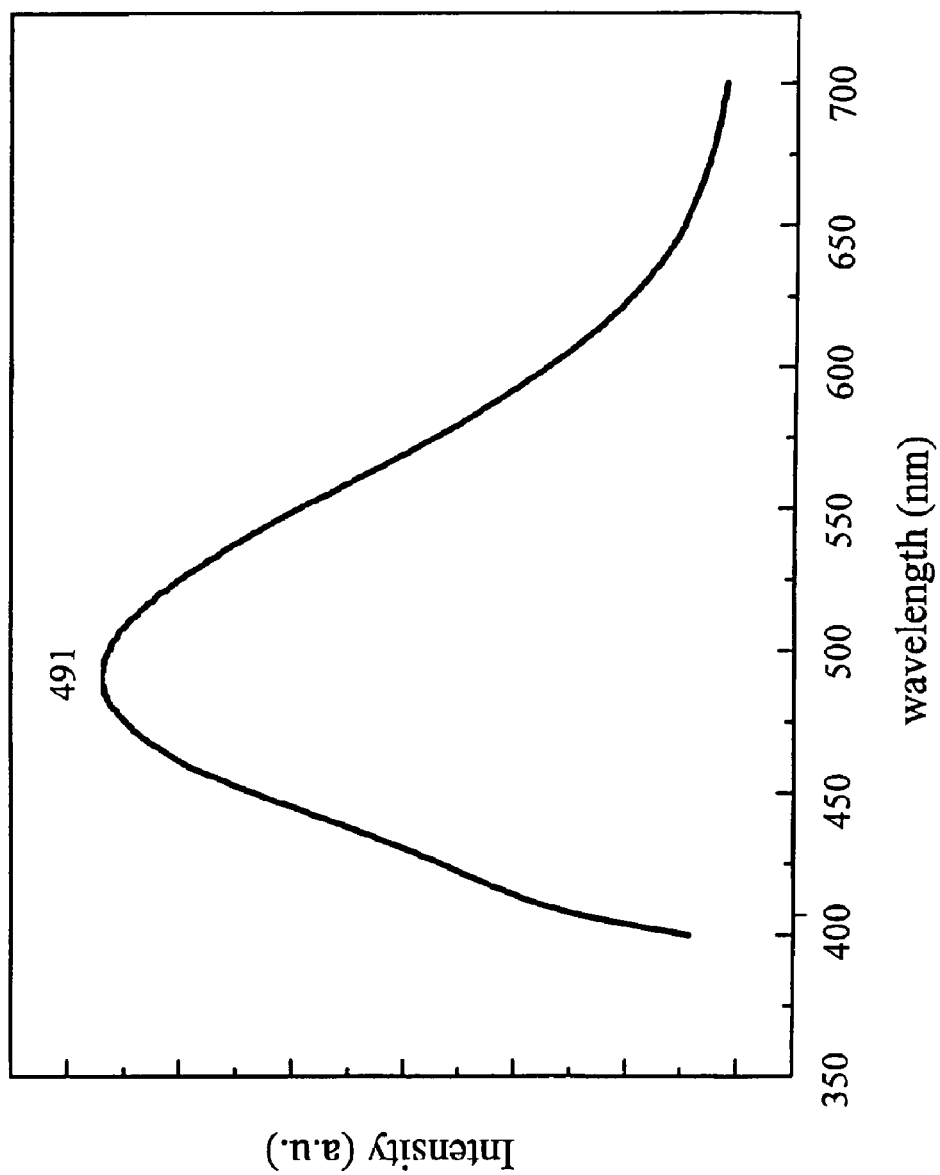
FIG. 18 shows the emission spectrum of $EuAl_2Si_2O_8$:10 wt. % Cl in Example 8 of the invention.
Figure 19:
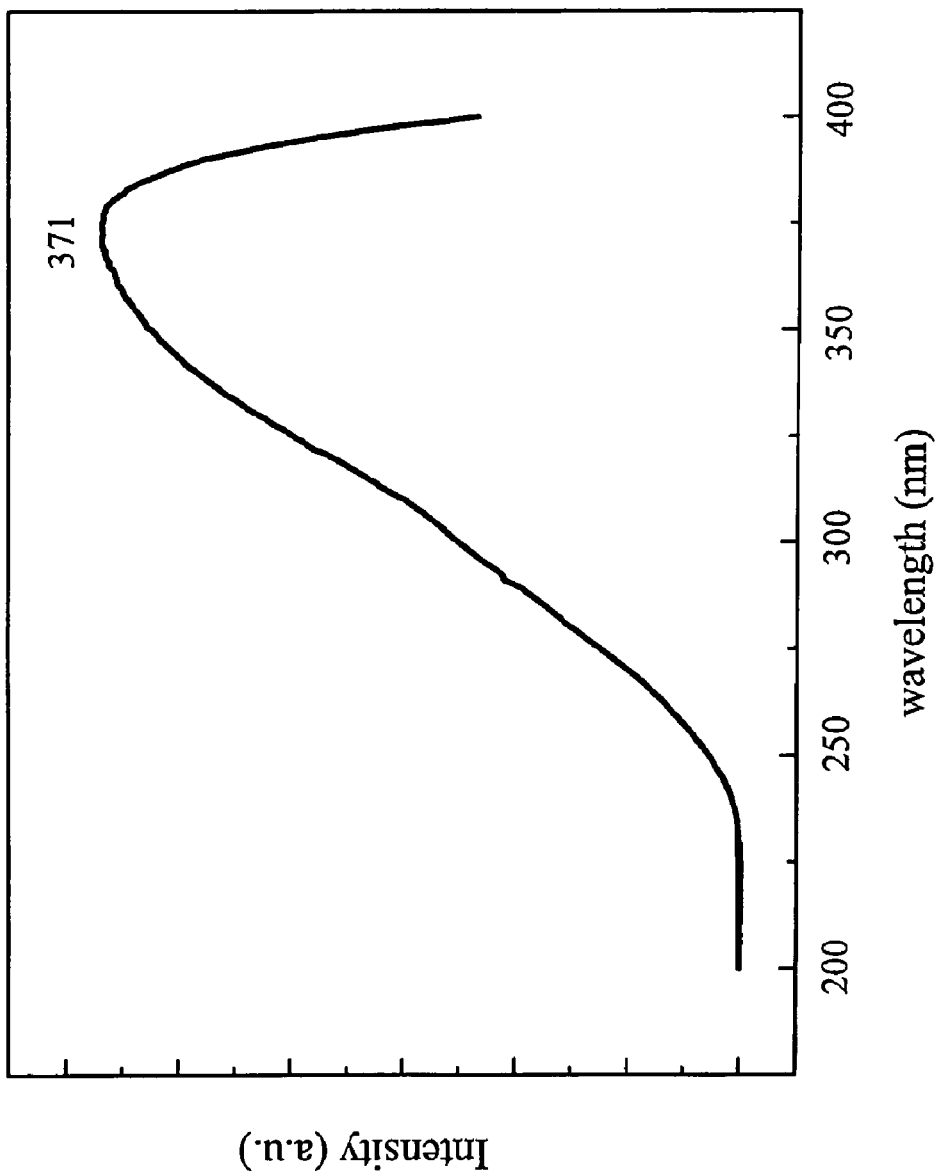
FIG. 19 shows the excitation spectrum of $EuAl_2Si_2O_8$: 10 wt. % Cl in Example 8 of the invention.

According to molar ratio of $EuAl_2Si_2O_8$:10 wt. % Cl, appropriate stoichiometry of $Al_2O_3$ (commercially available from Aldrich Chemicals Company Inc. in U.S.A., 99.99%, FW=101.96), $SiO_2$ (commercially available from AHA, 1.5 µm, 99.9%, FW=60.08), $EuCl_2$ (commercially available from Aldrich Chemicals Company Inc. in U.S.A., 99.99%, FW=222.87), and anhydrous NaCl (commercially available from Aldrich Chemicals Company Inc. in U.S.A., 99.99%, FW=58.44) were evenly mixed and grinded, and charged in a double-crucible. The double-crucible was then stuffed by graphite, and then heated in a high temperature furnace. After sintering at 1000-1450° C. for 8-12 hours, pure phase of the aluminosilicate phosphor $EuAl_2Si_2O_8$:10 wt. % Cl was prepared. The emission spectrum and the excitation spectrum of the described product are shown in FIGS. 18-19, respectively.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A white light illumination device, comprising:
an ultraviolet excitation light source; and
an ultraviolet excitable aluminosilicate phosphor;
an ultraviolet or blue light excitable yellow phosphor, or an ultraviolet or blue light excitable red phosphor and an ultraviolet or blue light excitable green phosphor,
wherein the ultraviolet excitable aluminosilicate phosphor has a formula

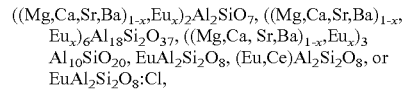

$0 \leq x \leq 1$.

2. The white light illumination device as claimed in claim 1, wherein the ultraviolet excitation light source has a wavelength of 300 nm to 400 nm, the ultraviolet excitable aluminosilicate phosphor is $EuAl_2Si_2O_8$ to emit a blue-green light, and the blue-green light has a major emission peak of about 489 nm.

3. The white light illumination device as claimed in claim 1, wherein the ultraviolet excitation light source has a wavelength of 300 nm to 400 nm, the ultraviolet excitable aluminosilicate phosphor is $(Eu_{0.9975}, Ce_{0.0025})Al_2Si_2O_8$ to emit a blue-green light, and the blue-green light has a major emission peak of about 490 nm.

4. The white light illumination device as claimed in claim 1, wherein the ultraviolet excitation light source has a wavelength of 300 nm to 400 nm, the ultraviolet excitable aluminosilicate phosphor is $(Eu_{0.9975}, Y_{0.0025})Al_2Si_2O_8$ to emit a blue-green light, and the blue-green light has a major emission peak of about 478 nm.

5. The white light illumination device as claimed in claim 1, wherein the ultraviolet excitation light source has a wavelength of 300 nm to 400 nm, the ultraviolet excitable aluminosilicate phosphor is $EuAl_2Si_2O_8$:Cl to emit a blue-green light, Cl and $EuAl_2Si_2O_8$ have a weight ratio of 10:100, and the blue-green light has a major emission peak of about 490 nm.

6. The white light illumination device as claimed in claim 1, wherein the an ultraviolet or blue light excitable yellow phosphor comprises YAG, TAG, or $(Mg, Ca, Sr, Ba)_2SiO_4$:$Eu^{2+}$.

7. The white light illumination device as claimed in claim 1, wherein the ultraviolet excitation light source is a light emitting diode or a laser diode.

8. The white light illumination device as claimed in claim 1, wherein the an ultraviolet or blue light excitable red phosphor comprises (Sr, Ca)S:$Eu^{2+}$, (Y, La, Gd, Lu)$_2$O$_3$:($Eu^{3+}$, $Bi^{3+}$), (Y, La, Gd, Lu)$_2$O$_2$S:($Eu^{3+}$, $Bi^{3+}$), Ca$_2$Si$_5$N$_8$:$Eu^{2+}$, or ZnCdS:AgCl.

9. The white light illumination device as claimed in claim 1, wherein the an ultraviolet or blue light excitable green phosphor comprises BaMgAl$_{10}$O$_{17}$:($Eu^{2+}$, $Mn^{2+}$), SrGa$_2$S$_4$:$Eu^{2+}$, (Ca, Sr, Ba)Al$_2$O$_4$:($Eu^{2+}$, $Mn^{2+}$), (Ca, Sr, Ba)$_4$Al$_{14}$O$_{25}$:$EU^{2+}$, or Ca$_8$Mg(SiO$_4$)$_4$Cl$_2$:($Eu^{2+}$, $Mn^{2+}$).

* * * * *